H. J. DUCKGEISCHEL.
RADIATOR NAME PLATE.
APPLICATION FILED MAR. 2, 1917.
1,281,537.
Patented Oct. 15, 1918.
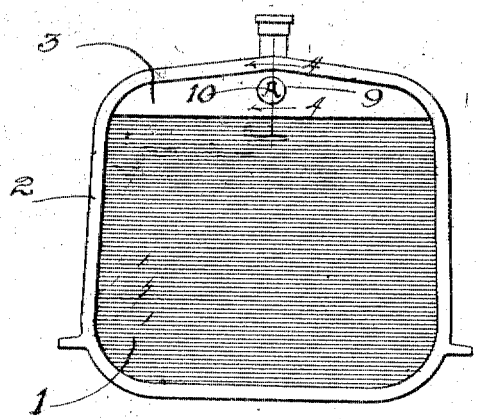
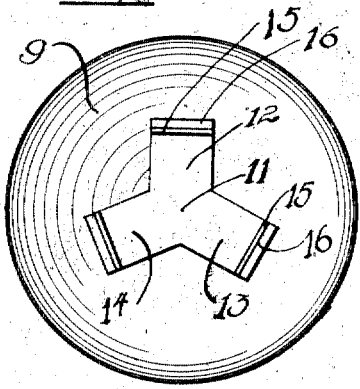
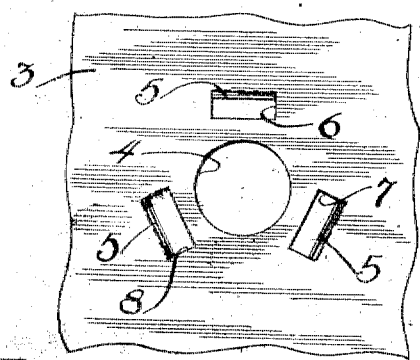
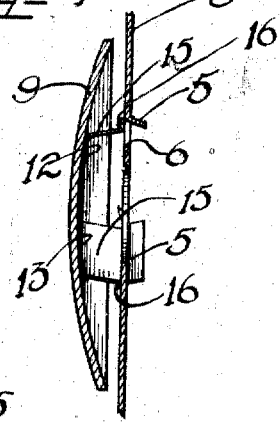
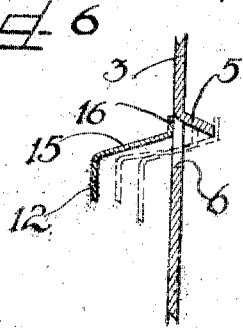
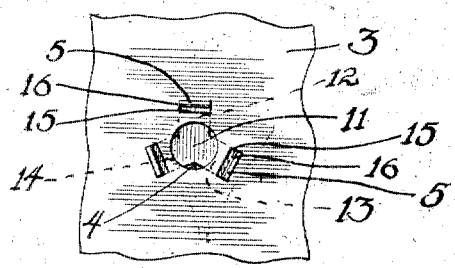
Witnesses
J. W. Angell
Charles Fields Jr.
Inventor
Henry J. Duckgeischel
by Charles W. Tills
Atty.

UNITED STATES PATENT OFFICE.

HENRY J. DUCKGEISCHEL, OF CHICAGO, ILLINOIS, ASSIGNOR TO S. D. CHILDS & COMPANY, OF CHICAGO, ILLINOIS, A CORPORATION OF ILLINOIS.

RADIATOR NAME-PLATE.

1,281,537.

Specification of Letters Patent.

Patented Oct. 15, 1918.

Application filed March 2, 1917. Serial No. 152,073.

*To all whom it may concern:*

Be it known that I, HENRY J. DUCKGEISCHEL, a citizen of the United States, and a resident of the city of Chicago, in the county of Cook and State of Illinois, have invented certain new and useful Improvements in Radiator Name-Plates; and I do hereby declare that the following is a full, clear, and exact description of the same, reference being had to the accompanying drawings, and to the numerals of reference marked thereon, which form a part of this specification.

This invention relates to an improved form of name plate for an automobile having resilient finger clips or spring members rigidly secured to the inner face of the name plate and adapted to be sprung into suitable apertures provided in the upper central portion of the radiator shell of the automobile, to rigidly hold the name plate in position.

It is an object of this invention to construct an automobile name plate having means thereon adapted to engage the radiator shell of an automobile to rigidly hold the name plate in position.

It is also an object of this invention to provide a name plate having a plurality of spring members secured thereon adapted to engage in suitable apertures provided in a radiator shell of an automobile to hold the name plate in position thereon.

It is furthermore an object of this invention to construct a name plate having a spider plate rigidly secured on the inner face thereof with the legs of the spider plate bent therefrom to permit the same to be engaged in apertures provided in the radiator shell of an automobile to rigidly hold the name plate in position.

It is an important object of this invention to provide a name plate for an automobile wherein resilient arms offset from one another are rigidly secured on the rear of the name plate and are adapted to engage in suitably spaced offset apertures in the radiator shell of the automobile to rigidly hold the name plate in position.

It is also an object of this invention to provide a name plate simple and inexpensive of construction adapted to be readily secured in a predetermined position upon the front of a radiator shell of an automobile.

Other and further important objects of the invention will be apparent from the disclosures in the drawings and specification.

The invention (in a preferred form) is illustrated in the drawings and hereinafter more fully described.

On the drawings:

Figure 1 is a front plan view of an automobile radiator and radiator shell having a name plate secured thereon embodying the principles of my invention.

Fig. 2 is an enlarged fragmentary rear view of a portion of the radiator shell showing the receiving apertures for the name plate.

Fig. 3 is a rear view of the name plate.

Fig. 4 is an enlarged section taken on line 4—4 of Fig. 1, showing the name plate in position to be pressed into place.

Fig. 5 is a rear plan view of a portion of the radiator shell showing the name plate in position.

Fig. 6 is a fragmentary section showing one of the spring attaching members in its initial position against the radiator shell, and showing the method of attaching the name plate in dotted lines.

As shown on the drawings:

The reference numeral 1, indicates an automobile radiator and the numeral 2, the radiator shell the upper portion of which has an integral plate 3, formed thereon as shown in Fig. 1, said plate having a centrally disposed circular aperture 4, therein. Cut or stamped from the plate 3, and surrounding the circular aperture 4, are a plurality of rearwardly directed lugs 5, slanting inwardly toward one another, and affording apertures or openings 6, 7 and 8, respectively, which are slightly offset from one another, the angles separating the same differing from one another for a purpose hereinafter described.

A convex name plate 9, made of metal or other suitable material, has a letter, monogram or emblem 10, brazed, soldered or enameled on the front or convex surface thereof, and rigidly secured by soldering or other suitable means centrally on the rear or concave surface of the name plate is a metal spider or attaching plate 11, formed with a plurality of integral resilient radially directed legs or springs 12, 13 and 14, respectively, each having its outer portion bent rearwardly away from the name plate as denoted by the numeral 15, and each having its end bent outwardly to afford an attaching hook, flange or toe 16. The legs 12, 13 and 14, are offset from one another the angles separating the same differing slightly and corresponding with the angles separating the respective apertures 6, 7 and 8, to permit the bent portion 15, of the legs 12, 13 and 14, to register with or project into the apertures 6, 7 and 8, respectively when it is desired to secure the name plate 9, upon the front of the radiator shell plate 3.

The operation is as follows:

The attaching or mounting of the name plate 9, is very simple, the monogram 10, being placed upon the front of the name plate so that the same shall be in an upright vertical position when the toe 16, of the leg 12, is positioned against the lug 5, of the aperture 6, as shown in Fig. 6, in which position the toes 16, of the legs 13 and 14, register with the apertures 7 and 8, respectively. This is the only position in which the toes of the legs 12, 13 and 14, will register with the apertures 6, 7 and 8, to permit mounting of the name plate, due to the offset relation of said legs and apertures. With the name plate 9, positioned as above described and as shown in Fig. 6, pressure is applied upon the name plate thus forcing the toes 16, of the resilient legs 12, 13 and 14, against the respective lugs 5, of the apertures 6, 7 and 8, springing the portions 15, inwardly toward one another as shown by the dotted lines of Fig. 6, until the toes 16, clear the ends of said lugs 5, and are sprung therebehind due to the action of the stressed portions 15, thus rigidly securing the name plate 9, clamped in position against the front surface of the radiator shell plate 3.

It will, of course, be understood that the name plate 3, may be of any desired shape, and that any number of offset attaching legs may be used to register and engage with a corresponding number of offset apertures provided in the radiator shell.

I am also aware that various other details of construction may be varied through a wide range without departing from the principles of this invention, and I therefore do not purpose limiting the patent granted otherwise than necessitated by the prior art.

I claim as my invention:

1. In a device of the class described the combination with a plate having offset apertures therein, of a name plate, and offset means thereon adapted in one position only to register and engage in said offset apertures to rigidly hold the name plate in position on said shell.

2. The combination with a plate of means struck inwardly therefrom affording a plurality of offset apertures therein, a name plate, and resilient offset means thereon adapted in one position only to project through said apertures and spring behind said means to rigidly hold the name plate in position upon the front of said radiator shell.

3. The combination with a plate having offset apertures therein, of a name plate, and offset resilient means on the rear thereof adapted in one position only to engage through said offset apertures to hold the name plate in position upon said plate.

4. The combination with a plate, means struck inwardly therefrom affording a plurality of offset apertures in said plate, a name plate, and resilient offset means on the rear thereof adapted in one position only to project through said apertures and engage behind said means to securely hold the name plate in position upon said plate.

In testimony whereof I have hereunto subscribed my name in the presence of two subscribing witnesses.

HENRY J. DUCKGEISCHEI

Witnesses:
CHARLES W. HILLS, Jr.,
LAWRENCE REIBSTEIN.